United States Patent
Woo et al.

(10) Patent No.: US 9,279,496 B2
(45) Date of Patent: Mar. 8, 2016

(54) CONTROL DEVICE FOR CONTINUOUSLY VARIABLE TRANSMISSION

(71) Applicant: JATCO LTD, Fuji-shi, Shizuoka (JP)

(72) Inventors: Youngjoo Woo, Seoul (KR); Jongkeun Lim, Seoul (KR); Junseok Choi, Gyeonggi-do (KR); Changnam Park, Gyeonggi-do (KR); MyongSeog Chang, Seoul (KR)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 14/389,599

(22) PCT Filed: Apr. 1, 2013

(86) PCT No.: PCT/JP2013/059870
§ 371 (c)(1),
(2) Date: Sep. 30, 2014

(87) PCT Pub. No.: WO2013/151000
PCT Pub. Date: Oct. 10, 2013

(65) Prior Publication Data
US 2015/0066320 A1 Mar. 5, 2015

(30) Foreign Application Priority Data
Apr. 2, 2012 (JP) .................................. 2012-084074

(51) Int. Cl.
*F16H 61/662* (2006.01)
*F16H 61/66* (2006.01)
*F16H 61/70* (2006.01)
*F16H 37/02* (2006.01)
*F16H 59/66* (2006.01)

(52) U.S. Cl.
CPC .... *F16H 61/66227* (2013.01); *F16H 61/66259* (2013.01); *F16H 61/702* (2013.01); *F16H 2037/023* (2013.01); *F16H 2059/663* (2013.01); *F16H 2061/6605* (2013.01); *F16H 2061/66209* (2013.01); *F16H 2312/02* (2013.01)

(58) Field of Classification Search
CPC ................... F16H 61/66227; F16H 61/66259; F16H 61/702
See application file for complete search history.

(56) References Cited

U.S. PATENT DOCUMENTS

2012/0035817 A1* 2/2012 Waku et al. ..................... 701/54

FOREIGN PATENT DOCUMENTS

| JP | 61-290269 | A | 12/1986 |
|---|---|---|---|
| JP | 63-087330 | A | 4/1988 |
| JP | 01-098748 | A | 4/1989 |
| JP | 04-169334 | A | 6/1992 |
| JP | 2001-182825 | A | 7/2001 |
| WO | WO 2009/116319 | A1 | 9/2009 |

* cited by examiner

*Primary Examiner* — Derek D Knight
(74) *Attorney, Agent, or Firm* — Foley & Lardner LLP (57) ABSTRACT

A frictional engagement element (32) that disconnects power between an engine (1) and a drive wheel (7) in a vehicle, and a control unit (11, 12) that controls a transmission ratio of a continuously variable transmission (4) and the frictional engagement element (32), are provided. When the transmission ratio is not a maximum transmission ratio at a vehicle stop when a vehicle speed is 0, the control unit (11, 12) operates the transmission ratio to the maximum transmission ratio while controlling the frictional engagement element (32) into a slip state. Further, at this time, when a road is an upward slope, the control unit (11, 12) sets an engagement pressure of the frictional engagement element (32) and an engine torque according to the road slope, prevents slidedown of the vehicle.

6 Claims, 4 Drawing Sheets

CONTROL DEVICE FOR CONTINUOUSLY VARIABLE TRANSMISSION

The present invention relates to a control device for a continuously variable transmission mounted in a vehicle.

BACKGROUND ART

In a vehicle having a continuously variable transmission, during deceleration before vehicle stop, by operating a transmission ratio up to a maximum transmission ratio by the time that the vehicle stops, starting performance at a subsequent re-start of the vehicle is ensured. However, in a case of the deceleration by hard braking during vehicle travelling, since a time required for the vehicle stop is short, it is not possible to operate the transmission ratio up to the maximum transmission ratio by the time that the vehicle stops. Further, if a wheel locks during the deceleration, even the operation to change the transmission ratio is not possible. Also after the vehicle stop, it is not possible to operate the transmission ratio as a matter of course.

Patent Document 1 discloses that in a vehicle provided with an auxiliary transmission having as a power transmission cut-off unit a clutch or a brake between the continuously variable transmission and a drive wheel, when the hard braking of the vehicle is detected, by disengaging the clutch or the brake of the auxiliary transmission and bringing power transmission between the auxiliary transmission and the drive wheel into a power transmission cut-off state, the changing operation of the transmission ratio becomes possible, then the transmission ratio is operated up to the maximum transmission ratio by the time that the vehicle re-starts afterwards. A technique of ensuring the starting performance, devised in this manner, is disclosed in the Patent Document 1.

Here, in the case of the technique of the Patent Document 1, when starting a control of the changing-operation of the transmission ratio to the maximum transmission ratio side with the power transmission brought in the cut-off state, as long as a throttle valve opening degree is 0 (zero) (a throttle valve is in a fully closed state), this control is performed until the transmission ratio reaches the maximum transmission ratio. Thus, during the carrying out of the transmission ratio control in this power transmission cut-off state, the power is not transmitted to the drive wheel. Therefore, if this control is performed when the vehicle stops on an upward slope (an uphill road), there is a risk that slide-down (or slip-down) of the vehicle will occur.

Further, in the case of the technique of the Patent Document 1, the power transmission cut-off is performed by pressure exhaust by exhausting working fluid from a working fluid supply oil passage that leads to the clutch and the brake. Thus, even when the transmission ratio control is completed and the power transmission is changed from the power transmission cut-off state to a power transmission allowable state, a time lag required for an engagement of the clutch or the brake occurs. For this reason, depending on a timing of the re-start, there is a possibility that a power transmission lag will occur. In order to reduce this power transmission lag, setting a line pressure to be high is effective. In this case, however, engagement shock of the clutch or the brake occurs, which is undesirable.

The present invention was made in view of the above technical problem. An object of the present invention is to provide a control device for the continuously variable transmission, which is capable of changing-operation of the transmission ratio of the continuously variable transmission up to the maximum transmission ratio (i.e. to a Lowest state) at the hard braking etc. of the vehicle even when the vehicle stops on the upward slope without the occurrence of the slide-down of the vehicle, and capable of suppressing the occurrence of the power transmission lag at the re-start without setting the line pressure to be high.

CITATION LIST

Patent Document

Patent Document 1: Japanese Patent Provisional Publication No. 61-290269

SUMMARY OF THE INVENTION (1) To achieve the object described above, a control device, of the present invention, for a continuously variable transmission mounted between an engine and a drive wheel in a vehicle and having a continuously variable transmission mechanism and a frictional engagement element that is installed at an output section, which leads to the drive wheel, of the continuously variable transmission and disconnects power, the control device controlling a transmission ratio of the continuously variable transmission mechanism and the frictional engagement element, the control device comprises: a vehicle speed detection unit that detects a vehicle speed of the vehicle; a transmission ratio detection unit that detects the transmission ratio; and a control unit that judges, on the basis of detection vehicle speed information from the vehicle speed detection unit, whether or not the transmission ratio detected by the transmission ratio detection unit is a maximum transmission ratio at a vehicle stop when the vehicle speed is 0, and when the detected transmission ratio is not the maximum transmission ratio, performs a Low-return control that operates the transmission ratio to the maximum transmission ratio while controlling the frictional engagement element into a slip state.

(2) The control device for the continuously variable transmission further comprises: a slope estimation unit that estimates a slope of a road where the vehicle stops. And it is preferable that the control unit judge whether or not the road slope estimated by the slope estimation unit is an upward slope, and when judging that the estimated road slope is the upward slope and performing the Low-return control, the control unit control, according to the estimated road slope, an engagement pressure of the frictional engagement element by which the frictional engagement element is brought into the slip state.

(3) In this case, it is preferable that, when judging that the estimated road slope is the upward slope and performing the Low-return control, the control unit control the engagement pressure of the frictional engagement element according to the estimated road slope, also set a torque required of the engine according to the estimated road slope, and output this setting torque to a control unit of the engine.

(4) Further, it is preferable that, when judging that the road slope estimated by the slope estimation unit is not the upward slope and performing the Low-return control, the control unit control the engagement pressure of the frictional engagement element by a smallest engagement pressure by which the frictional engagement element can be brought into the slip state.

(5) It is preferable that the control unit set a control time according to the transmission ratio detected at the vehicle stop, and perform the Low-return control only for the control time.

(6) It is preferable that the control unit start the Low-return control when an input and output rotation speed difference of the frictional engagement element controlled into the slip state becomes equal to or greater than a predetermined reference rotation speed difference.

(1) According to the control device for the continuously variable transmission, at the vehicle stop when the vehicle speed is 0, the Low-return control that operates the transmission ratio to the maximum transmission ratio with the frictional engagement element brought into the slip state which allows the transmission ratio of the continuously variable transmission mechanism to vary is performed. With this control, even when the vehicle stops by the hard braking, it is possible to operate the transmission ratio to the maximum transmission ratio, and also the power transmission to the drive wheel is not completely disconnected. Therefore, for instance, even in the case where the road where the vehicle stops is the uphill road, the slide-down (or the slip-down) of the vehicle can be suppressed. Further, since the frictional engagement element is in the slip state, the power transmission lag at the re-start can be suppressed, and there is no need to set the line pressure to be high.

(2) In the case where the road where the vehicle stops is the upward slope (i.e. the uphill road), the engagement pressure of the frictional engagement element by which the frictional engagement element is brought into the slip state is set according to the estimated road slope, and the engagement pressure of the frictional engagement element is controlled so as to become this setting engagement pressure. It is therefore possible to operate the transmission ratio to the maximum transmission ratio while surely suppressing the slide-down of the vehicle when the road where the vehicle stops is the uphill road.

(3) In this case, the torque required of the engine is set according to the estimated road slope, and the engine torque is controlled to this setting torque. It is therefore possible to operate the transmission ratio to the maximum transmission ratio while quite surely suppressing the slide-down of the vehicle when the road where the vehicle stops is the uphill road.

(4) When performing the Low-return control in the case where the road where the vehicle stops is not the upward slope, the engagement pressure of the frictional engagement element is controlled by the smallest engagement pressure by which the frictional engagement element can be brought into the slip state. It is therefore possible to save energy that is required for the supply of the engagement pressure.

(5) At this time, the Low-return control is performed only for the control time that is set according to the detected transmission ratio. It is thus possible to terminate the first Low-return control by a simple logic.

(6) When the input and output rotation speed difference of the frictional engagement element becomes equal to or greater than the predetermined reference rotation speed difference, the Low-return control is started. Therefore, the Low-return control can be smoothly performed.

BRIEF DESCRIPTION OF DRAWINGS

FIGS. 4A to 4C are flow charts (sub routines) for explaining a control by the control device of the continuously variable transmission according to one embodiment of the present invention.

EMBODIMENTS FOR CARRYING OUT THE INVENTION

In the following description, an embodiment of the present invention will be explained with reference to the drawings.

Figure 1:
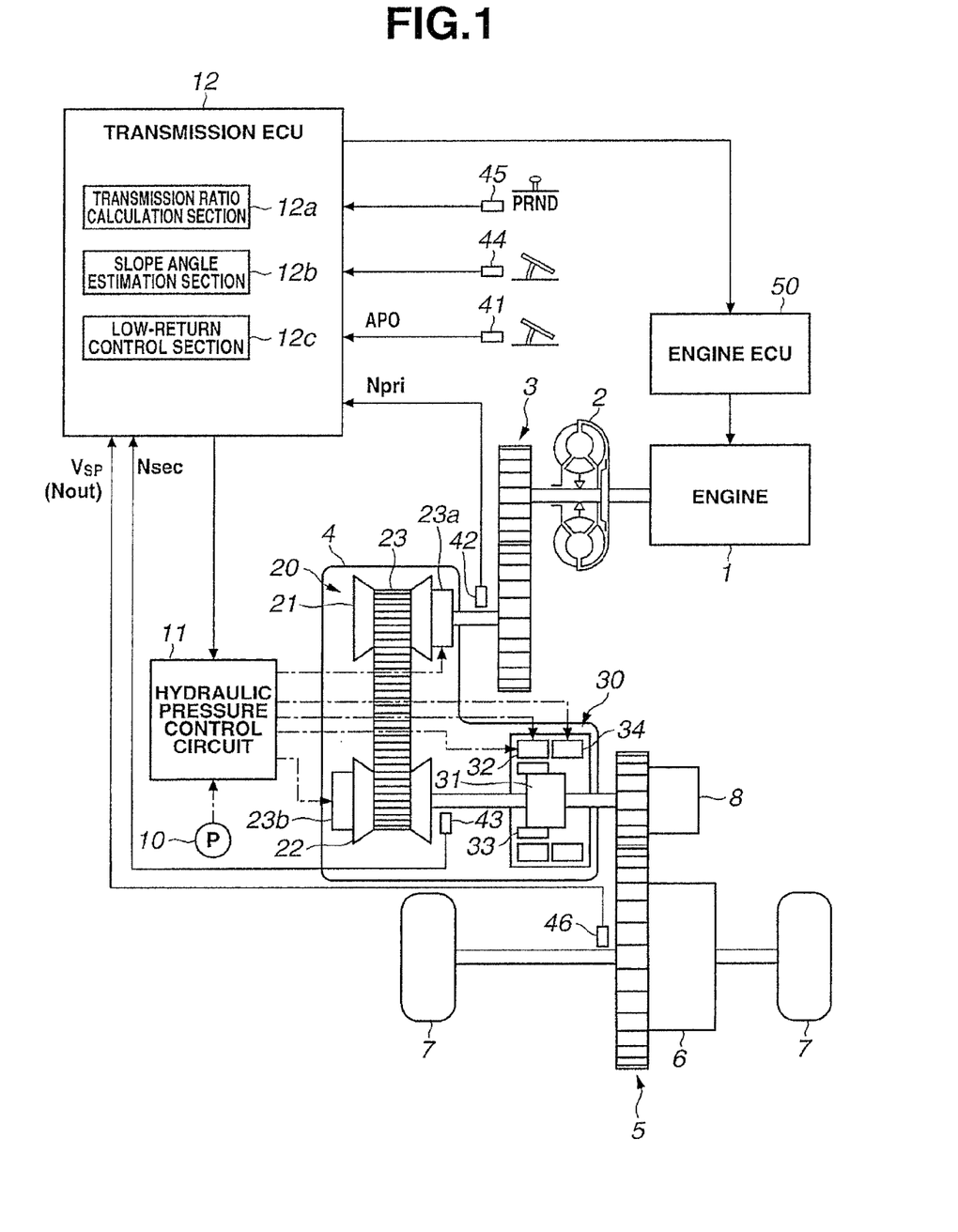
FIG. 1 is a block diagram showing a driveline of a vehicle in which a continuously variable transmission and a control device of the continuously variable transmission according to one embodiment of the present invention are mounted.

FIG. 1 is a block diagram of a driveline of a vehicle in which a continuously variable transmission and a control device of the continuously variable transmission according to the present embodiment are mounted. As shown in FIG. 1, this vehicle has an engine 1 as a power source. Output rotation of the engine 1 is transmitted to a drive wheel 7 through a torque converter 2 equipped with a lock-up clutch, a first gear train 3, the continuously variable transmission (hereinafter, also called simply a transmission) 4, a second gear train 5 and a final speed reduction device 6. The second gear train 5 is provided with a parking mechanism 8 that mechanically locks an output shaft of the transmission 4 so that the output shaft of the transmission 4 can not rotate upon parking.

Further, the vehicle has an oil pump 10 that is driven by using a part of the power of the engine 1, a hydraulic pressure control circuit 11 that controls or regulates a hydraulic pressure from the oil pump 10 and provides it to each part of the transmission 4, and a transmission controller (a transmission ECU) 12 that controls the hydraulic pressure control circuit 11. A control unit relating to shift is formed by the hydraulic pressure control circuit 11 and the transmission controller 12.

Each configuration will be explained. In the transmission 4, a belt-type continuously variable transmission mechanism (also called a CVT) 20 and an auxiliary transmission mechanism 30 are arranged in series on a power transmission path (on the driveline) from the engine 1 to the drive wheel 7. The auxiliary transmission mechanism 30 is placed at an output section, which leads to the drive wheel 7, of the transmission 4, i.e. at a rear stage (an output side) of the CVT 20. The auxiliary transmission mechanism 30 includes a frictional engagement element that disconnects the power. In the present embodiment, as the frictional engagement element, a Low brake 32 is provided. Its detailed explanation will be described later. The auxiliary transmission mechanism 30 is directly connected to an output shaft of the CVT 20 as shown in this embodiment, or could be connected to the output shaft of the CVT 20 through another transmission mechanism or power transmission mechanism (for instance, a gear train).

The CVT 20 has a primary pulley 21, a secondary pulley 22 and a V-belt 23 wound around these pulleys 21 and 22 and rotating around these pulleys 21 and 22. Each of the primary pulley 21 and the secondary pulley 22 has a stationary sheave and a movable sheave that is set with both sheave surfaces of the stationary and movable sheaves facing each other so as to form a V-shaped groove between the stationary and movable sheaves. Further, the primary pulley 21 and the secondary pulley 22 respectively have hydraulic cylinders 23a and 23b each of which is provided on a back surface of the movable sheave and moves the movable sheave in an axial direction of the movable sheave. When controlling or regulating a hydraulic pressure provided to the hydraulic cylinders 23a and 23b, each width of the V-shaped groove varies, and each contact radius between the V-belt 23 and each of the pulleys 21 and 22 varies, then a transmission ratio Ratio of the CVT 20 continuously varies.

In the present embodiment, the auxiliary transmission mechanism 30 is a transmission mechanism of forward 2 speeds and reverse 1 speed. The auxiliary transmission mechanism 30 has a ravigneaux planetary gear mechanism 31 in which carriers of two planetary gears are connected and a plurality of frictional engagement elements (the Low brake 32, a High clutch 33 and a Rev brake 34) which are engaged with a plurality of rotational elements that form the ravigneaux planetary gear mechanism 31 and which change their engagement states.

By controlling or regulating a supply pressure to each of the frictional engagement elements 32 to 34 and changing an engaging/disengaging state of each of the frictional engagement elements 32 to 34, a speed (a speed stage or a shift stage) of the auxiliary transmission mechanism 30 is changed. For instance, when the Low brake 32 is engaged and the High clutch 33 and the Rev brake 34 are each disengaged, the speed of the auxiliary transmission mechanism 30 is $1^{st}$ speed. This state can also be expressed as "the transmission 4 is a low speed mode". When the High clutch 33 is engaged and the Low brake 32 and the Rev brake 34 are each disengaged, the speed of the auxiliary transmission mechanism 30 is $2^{nd}$ speed whose transmission ratio is smaller than that of $1^{st}$ speed. This state can also be expressed as "the transmission 4 is a high speed mode". Further, when the Rev brake 34 is engaged and the Low brake 32 and the High clutch 33 are each disengaged, the speed of the auxiliary transmission mechanism 30 is the reverse speed.

Figure 2:
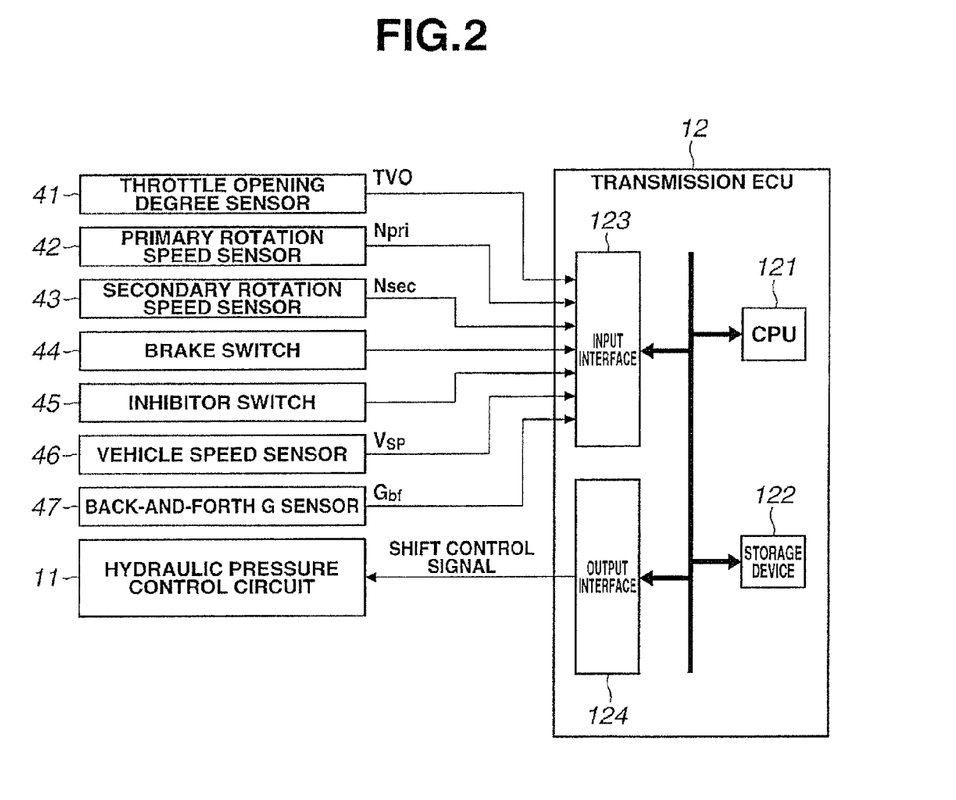
FIG. 2 is a block diagram showing a control system of the control device of the continuously variable transmission according to one embodiment of the present invention.

As shown in FIG. 2, the transmission controller 12 is formed from a CPU 121, a storage device 122 having RAM and ROM, an input interface 123, an output interface 124 and a bus 125 connecting these components to each other.

The input interface 123 inputs signals such as an output signal of a throttle opening degree sensor 41 that detects an opening degree (hereinafter, called a throttle opening degree TVO) of a throttle valve of the engine 1, an output signal of a primary rotation speed sensor 42 that detects a rotation speed (hereinafter, called a primary rotation speed Npri) of the primary pulley 21, an output signal of a secondary rotation speed sensor 43 that detects a rotation speed (hereinafter, called a secondary rotation speed Nsec) of the secondary pulley 22, a detection signal of a brake switch 44, an output signal of an inhibitor switch 45 that detects a position of a selection lever, an output signal of a vehicle speed sensor 46 that detects a travelling speed (hereinafter, called a vehicle speed Vsp) of the vehicle and an output signal of a back-and-forth G sensor (a back-and-forth acceleration sensor or a longitudinal G sensor) 47 that detects a back-and-forth acceleration (hereinafter, called an acceleration Gbf) of the vehicle.

The storage device 122 stores therein a shift control program of the transmission 4 and a shift map (not shown) used for this shift control program. The CPU 121 reads the shift control program stored in the storage device 122 and executes it. Also, the CPU 121 generates a shift control signal by performing computation for each signal inputted through the input interface 123, and outputs the shift control signal to the hydraulic pressure control circuit 11 through the output interface 124. Each value used for the computation by the CPU 121 and its computation result are stored in the storage device 122 as appropriate.

The hydraulic pressure control circuit 11 is formed by a plurality of flow passages and a plurality of hydraulic pressure control valves. In this hydraulic pressure control circuit 11, the plurality of hydraulic pressure control valves are controlled and a hydraulic pressure supply passage is changed on the basis of the shift control signal from the transmission controller 12, and a required hydraulic pressure is controlled or regulated from a hydraulic pressure produced by the oil pump 10. Then this hydraulic pressure is supplied to each part of the transmission 4. With this control and hydraulic pressure supply, the transmission ratio Ratio of the CVT 20 and the speed of the auxiliary transmission mechanism 30 are changed, the shift (the speed change) of the transmission 4 is then carried out.

[Control Device of Continuously Variable Transmission]

Here, the control device of the continuously variable transmission according to the present invention will be explained.

The control device has the hydraulic pressure control circuit 11 and the transmission controller 12, and controls the transmission ratio (positions of the movable pulleys of the primary pulley 21 and the secondary pulley 22) of the CVT 20, the engagement state of the Low brake 32 that is one of the frictional engagement elements of the auxiliary transmission mechanism 30, and torque of the engine 1.

Further, to perform this control, each detection signal from the primary rotation speed sensor 42, the secondary rotation speed sensor 43, the brake switch 44, the vehicle speed sensor 46 and the back-and-forth G sensor 47 is used.

Here, the detection signals Npri and Nsec from the primary rotation speed sensor 42 and the secondary rotation speed sensor 43 are used for calculation of the transmission ratio Ratio (=Npri/Nsec) of the CVT 20 in a transmission ratio calculation section 12a that is provided as a functional element in the transmission controller 12. Thus, a transmission ratio detection unit is formed from the primary rotation speed sensor 42, the secondary rotation speed sensor 43 and the transmission ratio calculation section 12a.

The detection signal of the vehicle speed sensor 46 is converted to a rotation speed Nout of an output side of the Low brake 32, then a difference (=Nsec−Nout) between the detection signal (the secondary rotation speed) Nsec of the secondary rotation speed sensor 43 which corresponds to a rotation speed of an input side of the Low brake 32 and the rotation speed Nout of the output side of the Low brake 32 is calculated in the transmission controller 12. The detection signal of the vehicle speed sensor 46 is used for the control in this manner.

The back-and-forth G sensor 47 is used for an estimation of a slope (a road slope) of a road where the vehicle stops by a slope angle estimation section 12b that is provided as the functional element in the transmission controller 12. Here, a degree or a magnitude of the slope is expressed by a slope angle (a back-and-forth inclination angle) θ.

At the vehicle stop, i.e. when the vehicle speed Vsp detected by the vehicle speed sensor 46 is 0, in a case where the road is a flat road where no slope is present, the back-and-forth G sensor 47 does not detect the back-and-forth G. However, in a case where the slope is present on a travelling road surface, the back-and-forth G sensor 47 reacts to gravity, and if the road is an upward slope (an uphill road), a positive value of the back-and-forth G is detected, and if the road is a downward slope (a downhill road), a negative value of the back-and-forth G is detected.

Further, in a case where the vehicle stops on a steep uphill road (an uphill road whose slope angle is large), the detected value of the back-and-forth G is greater than that of a case where the vehicle stops on a gentle uphill road (an uphill road whose slope angle is small).

Thus, there is a clear correlation between the detection value of the back-and-forth G sensor 47 and the slope angle (the back-and-forth inclination angle) θ at the vehicle stop. By previously obtaining this correlation, the slope angle θ can be estimated from the detection value of the back-and-forth G sensor 47.

The slope angle estimation section 12b of the present embodiment stores, in a map (not shown), this correlation between the back-and-forth G and the slope angle θ, and estimates the slope angle θ from the detection value of the back-and-forth G sensor 47 using this map.

Then, the transmission controller 12 is provided with a function (a Low-return control section) 12c that, at the vehicle stop when the vehicle speed becomes 0, judges whether or not the transmission ratio Ratio detected by the transmission ratio detection unit is a maximum transmission ratio (i.e. a Lowest state) on the basis of detection information from the vehicle speed sensor 46 and the brake switch 44, then when the detected transmission ratio Ratio is not the maximum transmission ratio, performs a Low-return control that operates the transmission ratio to the maximum transmission ratio while controlling the Low brake 32 of the frictional engagement element into a slip state.

This Low-return control section 12c performs a normal Low-return control (a second Low-return control) that carries out the Low-return control during the travelling when the vehicle speed Vsp is lowered to a predetermined vehicle speed or lower by a braking operation, and performs a vehicle stop Low-return control (a first Low-return control, which is the Low-return control according to the present invention) that carries out the Low-return control at the vehicle stop.

That is, the control device is a device that, in order to be ready for a re-start after the vehicle stop, performs the Low-return control that previously controls the transmission ratio Ratio of the CVT 20 to the Lowest (i.e. the maximum transmission ratio). The control device is formed from the transmission controller 12 and the hydraulic pressure control circuit 11. The transmission controller 12 controls the transmission ratio Ratio of the CVT 20 to the Lowest through the hydraulic pressure control circuit 11 when the vehicle decelerates by the braking and the vehicle speed is the predetermined vehicle speed or lower. This control is carried out by a decrease-control of the hydraulic pressure supplied to the hydraulic cylinder 23a of the primary pulley 21.

At a normal stop of the vehicle, since there is a deceleration time of a predetermined time or more, by decreasing the hydraulic pressure supplied to the hydraulic cylinder 23a of the primary pulley 21 within this deceleration time, the transmission ratio Ratio of the CVT 20 can be changed to the Lowest. However, at a sudden stop of the vehicle when a driver suddenly or abruptly depresses a brake pedal, there is a case where the change of the transmission ratio Ratio of the CVT 20 to the Lowest can not be completed by the time that the vehicle stops.

The change of the transmission ratio Ratio of the CVT 20 is generally performed when the CVT 20 is in operation. That is, the change of the transmission ratio Ratio of the CVT 20 can not be performed unless the primary pulley 21 and the secondary pulley 22 are rotating.

Therefore, the control device of the present embodiment brings the output section, which leads to the drive wheel 7, of the transmission 4, i.e. the frictional engagement element (also, simply called a clutch) that is provided between the CVT 20 and the drive wheel 7 and can disconnect the power, into the slip state so that even when the vehicle stops, the primary pulley 21 and the secondary pulley 22 can rotate.

In the present embodiment, since the auxiliary transmission mechanism 30 having the frictional engagement elements such as the Low brake 32, the High clutch 33 and the Rev brake 34 is installed between the CVT 20 and the drive wheel 7, the frictional engagement element of the auxiliary transmission mechanism 30, especially the Low brake 32 that is in the engaging state at a time when the vehicle decelerates and stops, is used. That is, the Low brake 32 is controlled into the slip state so that the primary pulley 21 and the secondary pulley 22 can rotate even in the vehicle stop state.

In order that the primary pulley 21 and the secondary pulley 22 can rotate, the Low brake 32 that is in the engaging state could be disengaged. However, in the case where the vehicle stops on the uphill road, if the Low brake 32 is disengaged, since the power transmission to the drive wheel 7 is cut-off (or disconnected), there is a risk that slide-down (or slip-down) of the vehicle will occur.

In addition, even in a case where the road where the vehicle stops is not the uphill road and there is no risk of the slide-down (or the slip-down) of the vehicle, if the Low brake 32 is fully disengaged, a time lag required for an engagement of the Low brake 32 occurs when a re-start request is made in this disengaging state of the Low brake 32. A power transmission lag due to this time lag causes a delay in the re-start of the vehicle. In order to reduce this lag, setting a line pressure to be high is effective. However, since this manner causes engagement shock of the clutch or the brake, it is not possible to employ this manner.

Thus, not by disengaging the Low brake 32, but by bringing the Low brake 32 into the slip state, the primary pulley 21 and the secondary pulley 22 can rotate even when the vehicle stops, and the power transmission to the drive wheel 7 can be possible, also the occurrence of the time lag required for the engagement of the Low brake 32 can be dissolved.

Here, if engagement parts of the Low brake 32 touch each other even by slight contact, the Low brake 32 can be merely brought into the slip state on the road except the uphill road. However, in the case where the vehicle stops on the uphill road, in order that the vehicle does not slide down (or slip down), it is required to transmit power of such magnitude only as to prevent the slide-down (or the slip-down) of the vehicle to the drive wheel 7. To transmit the required power to the drive wheel 7 while controlling the Low brake 32 into the slip state, an engagement pressure of the Low brake 32 could be increased. However, if the engagement pressure of the Low brake 32 is increased, the rotation speed of the primary pulley 21 and the secondary pulley 22 cannot adequately be secured, and it takes time to change the transmission ratio Ratio of the CVT 20 up to the Lowest.

Accordingly, in the present embodiment, the required power is transmitted to the drive wheel 7 by increase-controlling the engine torque while suppressing or holding the engagement pressure of the Low brake 32 so that the required power can be transmitted to the drive wheel 7 without increasing the engagement pressure of the Low brake 32 to an excessively high pressure.

The power of such magnitude only as to prevent the slide-down of the vehicle, to be transmitted to the drive wheel 7, corresponds to the slope (a back-and-forth inclination) of the uphill road. Thus, the control device of the present invention estimates the slope (the back-and-forth inclination) of the uphill road, and sets the engagement pressure (a clutch engagement capacity) of the Low brake 32 and a torque (a required engine torque) required of the engine 1 according to this estimated road slope (an estimated road slope), then controls the engagement pressure of the Low brake 32 and the torque of the engine 1 so that the engagement pressure of the Low brake 32 becomes a setting engagement pressure (a setting pressure) and the torque of the engine 1 becomes a setting engine torque (a setting torque). The control of the engine torque is performed thorough an engine controller (an engine ECU) 50 by sending the setting torque to the engine controller 50. Here, in the present embodiment, the setting of the clutch engagement capacity and the required engine torque is performed by calculation using a previously provided map.

The control of the engagement pressure (the clutch engagement capacity) of the Low brake 32 and the torque of the engine 1 at this time is performed according to the slope (the inclination) of the uphill road. Thus, here, this control, especially a setting operation of each value about this control, is also called an inclination control.

On the other hand, in the case of the road except the uphill road, the Low brake 32 is merely required to be brought into the slip state, and it is merely required that the engagement parts of the Low brake 32 touch each other even by slight contact. Therefore, as this engagement pressure (clutch engagement capacity) of the Low brake 32, for instance, a constant engagement pressure (a constant clutch engagement capacity) based on a smallest engagement pressure by which the Low brake 32 can be brought into the slip state is previously set, and the Low brake 32 is controlled to this constant engagement pressure, but the torque of the engine 1 is not particularly controlled. Thus, the engine 1 is in an idle operating state.

Further, the vehicle stop Low-return control (the first Low-return control) is started when an input and output rotation speed difference of the Low brake 32, which arises by the fact that the Low brake 32 is brought into the slip state, i.e. the difference (=Nsec−Nout) between the rotation speed (the secondary rotation speed) Nsec of the input side of the Low brake 32 and the rotation speed Nout of the output side of the Low brake 32, is equal to or greater than a reference value δ. With this setting, the Low-return control can be smoothly performed.

[Operation or Working and Effect of Control Device of Continuously Variable Transmission]

Figure 3:
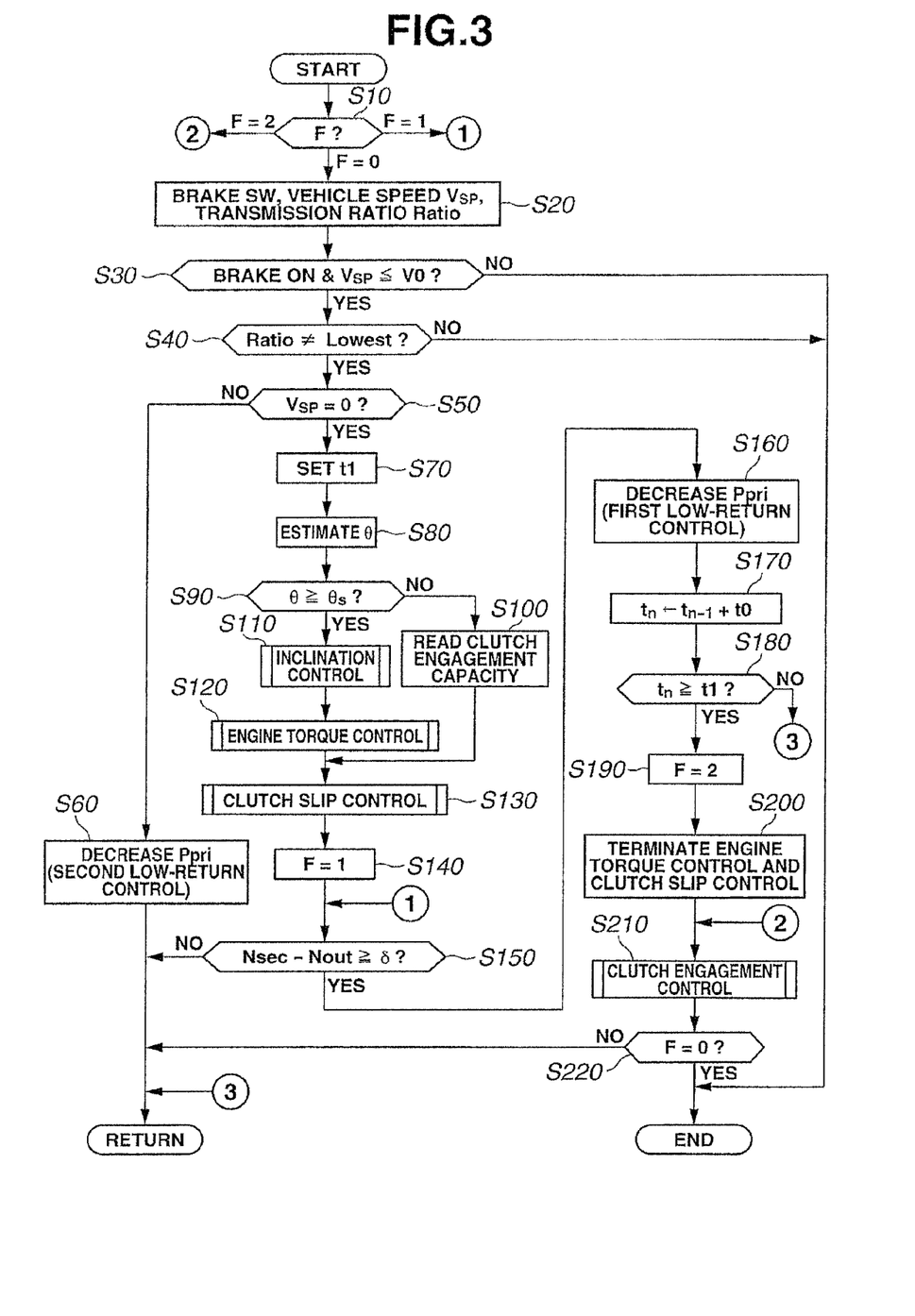
FIG. 3 is a flow chart (a main routine) for explaining a control by the control device of the continuously variable transmission according to one embodiment of the present invention.
Figure 4A:
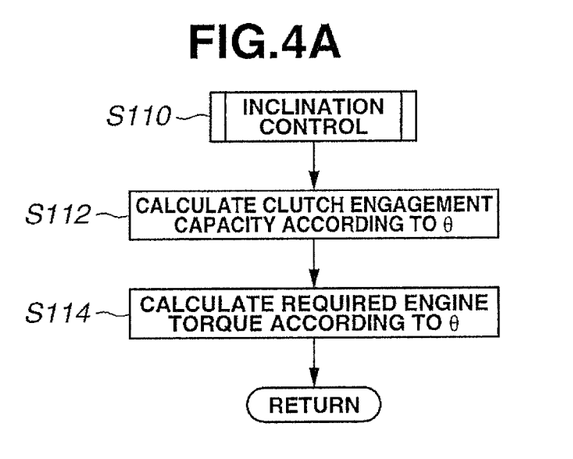
FIG. 4A shows an inclination control.
Figure 4B:
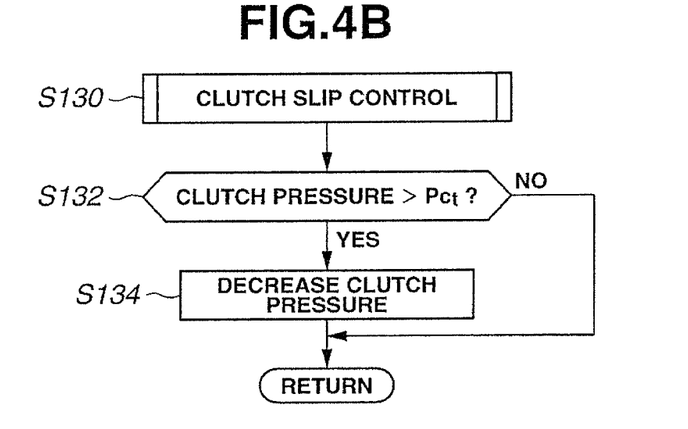
FIG. 4B shows a clutch slip control.
Figure 4C:
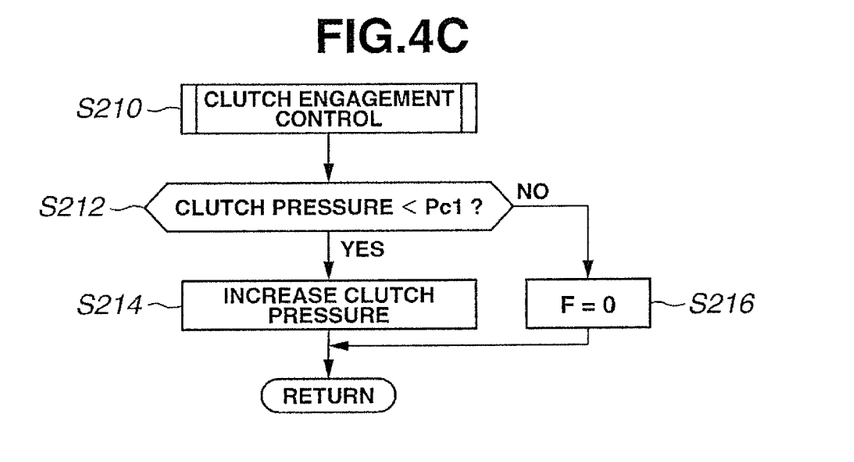
FIG. 4C shows a clutch engagement control.

The control device of the continuously variable transmission according to one embodiment of the present invention is formed as described above, and the control of the continuously variable transmission is performed, for instance, as shown in FIGS. 3 and 4. Flows shown in FIGS. 3 and 4 are started with a start of the vehicle, and repeatedly executed at a predetermined control interval.

As shown in FIG. 3, first, a control flag F is judged (at step S10). This control flag F is 0 at a control start, and afterwards is set to 1 during execution of the first Low-return control (i.e. when the first Low-return control is in progress) at the vehicle stop. Further, the control flag F is set to 2 during execution of the engagement control (the clutch engagement control) of the Low brake 32 after the first Low-return control is terminated. When the engagement control of the Low brake 32 is completed, the control flag F is reset (is set to 0).

If the control flag F is 0, each information of the brake switch, the vehicle speed Vsp and the transmission ratio Ratio is read (at step S20), and a judgment is made as to whether or not the vehicle speed Vsp is a setting vehicle speed V0 or less in a braking state (in a brake ON state) (at step S30). If a current state is not the braking state or the vehicle speed Vsp is greater than the setting vehicle speed V0, the present control is ended. If the vehicle speed Vsp is the setting vehicle speed V0 or less in the braking state, a judgment is made as to whether or not the transmission ratio Ratio is the Lowest (i.e. the maximum transmission ratio) (at step S40). If the transmission ratio Ratio is the Lowest, the present control is ended.

On the other hand, if the transmission ratio Ratio is not the Lowest, a judgment is made as to whether or not the vehicle speed Vsp is 0 (at step S50). If the vehicle speed Vsp is not 0, the second Low-return control that decreases a primary pressure Ppri is performed (at step S60). Normally, the transmission ratio Ratio is operated up to the Lowest by the time that the vehicle stops by the second Low-return control, and the control is finally ended by a negative judgment at step S40. However, when the transmission ratio Ratio does not reach the Lowest by the time that the vehicle stops by an abrupt deceleration etc., affirmative judgments are made at steps S40 and S50.

In this case, first, a Low-return control time t1 according to the transmission ratio Ratio at this time is set (at step S70). Although this Low-return control time t1 will be described later, the greater the difference between the transmission ratio Ratio and the Lowest, the longer the Low-return control time t1 is set. Subsequently, the slope angle (the back-and-forth inclination angle) θ of the road where the vehicle stops is estimated (at step S80). Then, the slope angle θ is compared with an uphill road judgment reference value θs (at step S90). The uphill road judgment reference value θs is a positive value that is close to 0 (in a case of the upward slope, the slope angle θ is positive). Here, if the slope angle θ is less than the uphill road judgment reference value θs, since the road where the vehicle stops is not the uphill road, the predetermined constant engagement pressure (the predetermined constant clutch engagement capacity) is read (at step S100), then the clutch slip control is performed by this constant engagement pressure (at step S130).

On the other hand, if the slope angle θ is equal to or larger than the uphill road judgment reference value θs, since the road where the vehicle stops is the uphill road, first, an operation of the inclination control is performed (at step S110). In this operation of the inclination control, as shown in FIG. 4A, the engagement pressure (the clutch engagement capacity) of the Low brake 32 is calculated according to the slope angle θ (at step S112), and the torque (the required engine torque) required of the engine 1 is calculated according to the slope angle θ (at step S114). In general, the larger the slope angle θ, the higher the engagement pressure (the clutch engagement capacity) of the Low brake 32 is set. Likewise, the larger the slope angle θ, the greater the torque of the engine 1 is set.

When the inclination control is terminated, as shown in FIG. 3, the torque of the engine 1 is controlled according to the required engine torque (at step S120), and the clutch slip control is performed by the calculated clutch engagement capacity (at step S130).

In this clutch slip control, as shown in FIG. 4B, the engagement pressure (a clutch pressure) of the Low brake 32 is decreased until the engagement pressure (the clutch pressure) of the Low brake 32 becomes a target pressure Pct (at steps S132 and S134). Here, if the road is not the uphill road, this target pressure Pct is the constant engagement pressure (the constant clutch engagement capacity) read at step S100. If the road is the uphill road, the target pressure Pct is the engagement pressure (the clutch engagement capacity) according to the slope angle θ, which is calculated at step S112. This pressure decrease is carried out by decreasing the engagement pressure by a predetermined pressure at the control interval.

During execution of this clutch slip control (i.e. when this clutch slip control is in progress), the control flag F is set to 1 (at step S140). Then, the input and output rotation speed difference of the Low brake 32, i.e. the difference (=Nsec−Nout) between the detection signal (the secondary rotation speed) Nsec of the secondary rotation speed sensor 43 which corresponds to the rotation speed of the input side of the Low brake 32 and the rotation speed Nout of the output side of the Low brake 32, is calculated. Then, this input and output rotation speed difference is compared with the reference value δ (at step S150).

Here, if the input and output rotation speed difference becomes equal to or greater than the reference value δ, the first Low-return control that decreases the primary pressure Ppri is performed (at step S160). With regard to this first Low-return control, timer count (a count value $t_n$, an initial value of $t_n$ is 0, a count additional value is t0) is started (at step S170), then the first Low-return control is continuously performed until the timer count value $t_n$ reaches the Low-return control time t1 (at step S180) that is set according to the transmission ratio Ratio.

If the timer count value $t_n$ reaches the Low-return control time t1, the control flag F is set to 2 (at step S190). Then, the engine torque control (step S120) and the clutch slip control (step S130) are terminated (at step S200), and the clutch engagement control is performed (at step S210).

In this clutch engagement control, as shown in FIG. 4C, the engagement pressure (the clutch pressure) of the Low brake 32 is increase-controlled until the engagement pressure (the clutch pressure) of the Low brake 32 becomes an engagement pressure Pc1 (at steps S212 and S214). When the engagement pressure (the clutch pressure) of the Low brake 32 becomes the engagement pressure Pc1, the control flag F is reset (is set to 0) (at step S216). Then, a termination judgment is made (at step S220), and the control is ended.

Accordingly, even at the vehicle stop when the vehicle speed becomes 0 by the hard braking, it is possible to operate the transmission ratio to the maximum transmission ratio, thus the starting performance at the re-start of the vehicle can be ensured. Further, also at this time, since the power transmission to the drive wheel 7 is not completely disconnected, even in the case where the road where the vehicle stops is the uphill road, the slide-down (or the slip-down) of the vehicle can be suppressed. Moreover, since the Low brake 32 of the frictional engagement element is in the slip state, the occurrence of the power transmission lag at the re-start can be suppressed, and there is no need to set the line pressure to be high.

In addition, in the case where the road where the vehicle stops is the upward slope (i.e. the uphill road), the engagement pressure by which the Low brake 32 of the frictional engagement element is brought into the slip state is set according to the slope angle θ of the road, and the engagement pressure of the Low brake 32 is controlled so as to become this setting pressure. It is therefore possible to operate the transmission ratio to the maximum transmission ratio while surely suppressing the slide-down of the vehicle when the road where the vehicle stops is the uphill road.

In the present embodiment, further, the torque required of the engine 1 is set according to the slope angle θ and the engine torque is controlled. It is thus possible to immediately operate the transmission ratio to the maximum transmission ratio while quite surely suppressing the slide-down of the vehicle on the uphill road.

In the case where the road where the vehicle stops is not the upward slope, the engagement pressure of the Low brake 32 is controlled by the smallest engagement pressure by which the frictional engagement element can be brought into the slip state. It is therefore possible to save energy that is required for the supply of the engagement pressure.

Further, the first Low-return control is performed only for the Low-return control time t1 that is set so that the greater the difference between the transmission ratio Ratio and the Lowest, the longer the Low-return control time t1. It is thus possible to terminate the first Low-return control by a simple logic.

Furthermore, when the input and output rotation speed difference of the Low brake 32 becomes greater than the predetermined reference rotation speed difference δ, the first Low-return control is started. Therefore, the first Low-return control can be smoothly performed.

Although the embodiment of the present invention has been explained above, the present invention is not limited to the embodiment described above. Each element or component disclosed in the above embodiment includes all design modifications and equivalents belonging to the technical scope of the present invention.

For instance, in the above embodiment, when performing the slip control of the frictional engagement element at the vehicle stop on the uphill road, the engine torque is also controlled. However, only the engagement pressure could be controlled without controlling the engine torque.

Further, in the above embodiment, the judgment is made as to whether or not the vehicle speed Vsp is the setting vehicle speed V0 or less in the braking state (at step S30), and when the vehicle speed Vsp is the setting vehicle speed V0 or less in the braking state, the judgment is made as to whether or not the transmission ratio Ratio is the Lowest (at step S40). However, as a prerequisite for judgment as to whether or not the transmission ratio Ratio is the Lowest, the judgment as to whether or not the current state is the braking state could be omitted. That is, the judgment at step S30 in FIG. 3 could be a simple judgment of "the judgment is made as to whether or not the vehicle speed Vsp is the setting vehicle speed V0 or less". Then, if the vehicle speed Vsp is not the setting vehicle speed V0 or less, the present control is ended. And if the vehicle speed Vsp is the setting vehicle speed V0 or less, the judgment is made as to whether or not the transmission ratio Ratio is the Lowest. This case does not require information concerning the presence or absence of the braking from the brake switch etc.

Furthermore, as the continuously variable transmission mechanism, not only the belt-type, but also a chain-type and a toroidal-type could be employed.

Moreover, the frictional engagement element is not limited to the Low brake 32 as long as the frictional engagement element is installed at the output section, which leads to the drive wheel, of the transmission and can disconnect the power.

The invention claimed is:

1. A control device for a continuously variable transmission mounted between an engine and a drive wheel in a vehicle and having a continuously variable transmission mechanism and a frictional engagement element that is installed at an output section, which leads to the drive wheel, of the continuously variable transmission and disconnects power, the control device controlling a transmission ratio of the continuously variable transmission mechanism and the frictional engagement element, the control device comprising:

a vehicle speed detection unit that detects a vehicle speed of the vehicle;

a transmission ratio detection unit that detects the transmission ratio; and a control unit that judges, on the basis of detection vehicle speed information from the vehicle speed detection unit, whether or not the transmission ratio detected by the transmission ratio detection unit is a maximum transmission ratio at a vehicle stop when the vehicle speed is 0, and when the detected transmission ratio is not the maximum transmission ratio, performs a Low-return control that operates the transmission ratio of the continuously variable transmission mechanism to the maximum transmission ratio while controlling the frictional engagement element into a slip state.

2. The control device for the continuously variable transmission as claimed in claim 1, further comprising:

a slope estimation unit that estimates a slope of a road where the vehicle stops, and wherein the control unit judges whether or not the road slope estimated by the slope estimation unit is an upward slope, and when judging that the estimated road slope is the upward slope and performing the Low-return control, the control unit controls, according to the estimated road slope, an engagement pressure of the frictional engagement element by which the frictional engagement element is brought into the slip state.

3. The control device for the continuously variable transmission as claimed in claim 2, wherein:

when judging that the estimated road slope is the upward slope and performing the Low-return control, the control unit controls the engagement pressure of the frictional engagement element according to the estimated road slope, also sets a torque required of the engine according to the estimated road slope, and outputs this setting torque to a control unit of the engine.

4. The control device for the continuously variable transmission as claimed in claim 2, wherein:

when judging that the road slope estimated by the slope estimation unit is not the upward slope and performing the Low-return control, the control unit controls the engagement pressure of the frictional engagement element by a smallest engagement pressure by which the frictional engagement element can be brought into the slip state.

5. The control device for the continuously variable transmission as claimed in claim 1, wherein:

the control unit sets a control time according to the transmission ratio detected at the vehicle stop, and performs the Low-return control only for the control time.

6. The control device for the continuously variable transmission as claimed in claim 1, wherein:

the control unit starts the Low-return control when an input and output rotation speed difference of the frictional engagement element controlled into the slip state becomes equal to or greater than a predetermined reference rotation speed difference.

* * * * *